United States Patent
Mandel et al.

(10) Patent No.: US 10,135,912 B2
(45) Date of Patent: *Nov. 20, 2018

(54) INTEGRATED EXPERIENCE FOR APPLICATIONS WITHIN A MOBILE APPLICATION

(71) Applicant: Sears Brands, L.L.C., Hoffman Estates, IL (US)

(72) Inventors: Shay Mandel, Kiryat Ono (IL); Gadi Lifshitz, Kiryat Ono (IL); Guy Ephraim, Herzlia (IL); Ofer Egozi, Kfar Vitkin (IL); Jen-Hao Yang, Schaumburg, IL (US); Bharath Sridharan, Glendale Heights, IL (US); Ehud Halberstam, Kfar Saba (IL); Shani Raba, Rishon LeZion (IL)

(73) Assignee: Sears Brands, L.L.C., Hoffman Estates, IL (US)

( * ) Notice: Subject to any disclaimer, the term of this patent is extended or adjusted under 35 U.S.C. 154(b) by 308 days.

This patent is subject to a terminal disclaimer.

(21) Appl. No.: 15/077,792

(22) Filed: Mar. 22, 2016

(65) Prior Publication Data

US 2016/0205176 A1 Jul. 14, 2016

Related U.S. Application Data

(63) Continuation of application No. 14/039,955, filed on Sep. 27, 2013, now Pat. No. 9,294,554.

(60) Provisional application No. 61/707,305, filed on Sep. 28, 2012.

(51) Int. Cl.
| | |
|---|---|
| G06F 3/048 | (2013.01) |
| H04L 29/08 | (2006.01) |
| G06F 3/0482 | (2013.01) |
| G06F 3/0484 | (2013.01) |

(52) U.S. Cl.
CPC ............ *H04L 67/10* (2013.01); *G06F 3/0482* (2013.01); *G06F 3/04842* (2013.01); *H04L 67/02* (2013.01); *H04L 67/34* (2013.01)

(58) Field of Classification Search
CPC ... G06F 15/16; G06F 9/44; G06F 8/30; H04L 51/32; H04L 67/10
See application file for complete search history.

(56) References Cited

U.S. PATENT DOCUMENTS

| | | | |
|---|---|---|---|
| 8,484,100 | B2 | 7/2013 | Feldman et al. |
| 2007/0006206 | A1 | 1/2007 | Dhanjal et al. |
| 2007/0055936 | A1 | 3/2007 | Dhanjal et al. |
| 2009/0006638 | A1 | 1/2009 | George et al. |
| 2009/0307105 | A1 | 12/2009 | Lemay et al. |
| 2010/0318985 | A1 | 12/2010 | Moffatt et al. |
| 2010/0318989 | A1 | 12/2010 | Dureau et al. |
| 2012/0260232 | A1 | 10/2012 | Hirsch et al. |
| 2012/0331488 | A1 | 12/2012 | Marathe et al. |
| 2013/0305218 | A1 | 11/2013 | Hirsch et al. |
| 2014/0025521 | A1 | 1/2014 | Alsina et al. |
| 2014/0075338 | A1 | 3/2014 | Lifshitz et al. |

*Primary Examiner* — Rashawn N Tillery
(74) *Attorney, Agent, or Firm* — McAndrews, Held & Malloy, Ltd.

(57) ABSTRACT

A system and method that supports an integrated user interface experience with third party hosted applications selected and installed by a user within a user-installed native application of a user communication device.

24 Claims, 12 Drawing Sheets

INTEGRATED EXPERIENCE FOR APPLICATIONS WITHIN A MOBILE APPLICATION

CROSS-REFERENCE TO RELATED APPLICATIONS

The present application is a continuation of U.S. patent application Ser. No. 14/039,955, filed Sep. 27, 2013, which makes reference to, claims benefit of, and claims priority to U.S. Provisional Patent Application No. 61/707,305, filed Sep. 28, 2012, the complete subject matter of each of which is hereby incorporated herein by reference, in its respective entirety.

FIELD OF THE INVENTION

Certain embodiments of the invention relate to methods supporting access to additional user selected functionality within an application on a mobile device. More specifically, certain embodiments of the present invention relate to methods and systems that provide an integrated user interface experience for applications selected by a user and accessed from within a user-installed native application residing on a mobile communication device.

BACKGROUND OF THE INVENTION

Web sites are typically assembled by creating a number of web pages containing still pictures, graphical elements, portions of text, motion video, audio materials. Executable scripts may be used both at the web client and within the web site infrastructure, to perform various functions. The functionality available to a user of a conventional web site is typically defined by the developer(s) involved in the creation of the web site, and each user simply accesses the functionality provided when a given page is delivered to the user's web client and rendered for display. The same functionality is typically available to all users of a given web page of particular web site.

Users of mobile devices able to connect to the Internet may select and install applications or "apps" on their mobile devices. Such applications are generally in the form of what is referred to as "native code." That is, each app is a software program or collection of executable instructions designed for use on the particular hardware or with the particular operating system of the mobile communication device of the user. The functionality of such apps is normally defined by the app developer when the app is prepared for distribution through what is normally referred to as an "app store." Each user that selects and installs a particular app has the same set of functionality available to them.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method that provides an integrated user interface experience for non-native applications selected by a user and accessed from within a user-installed native application on a mobile communication device, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1:
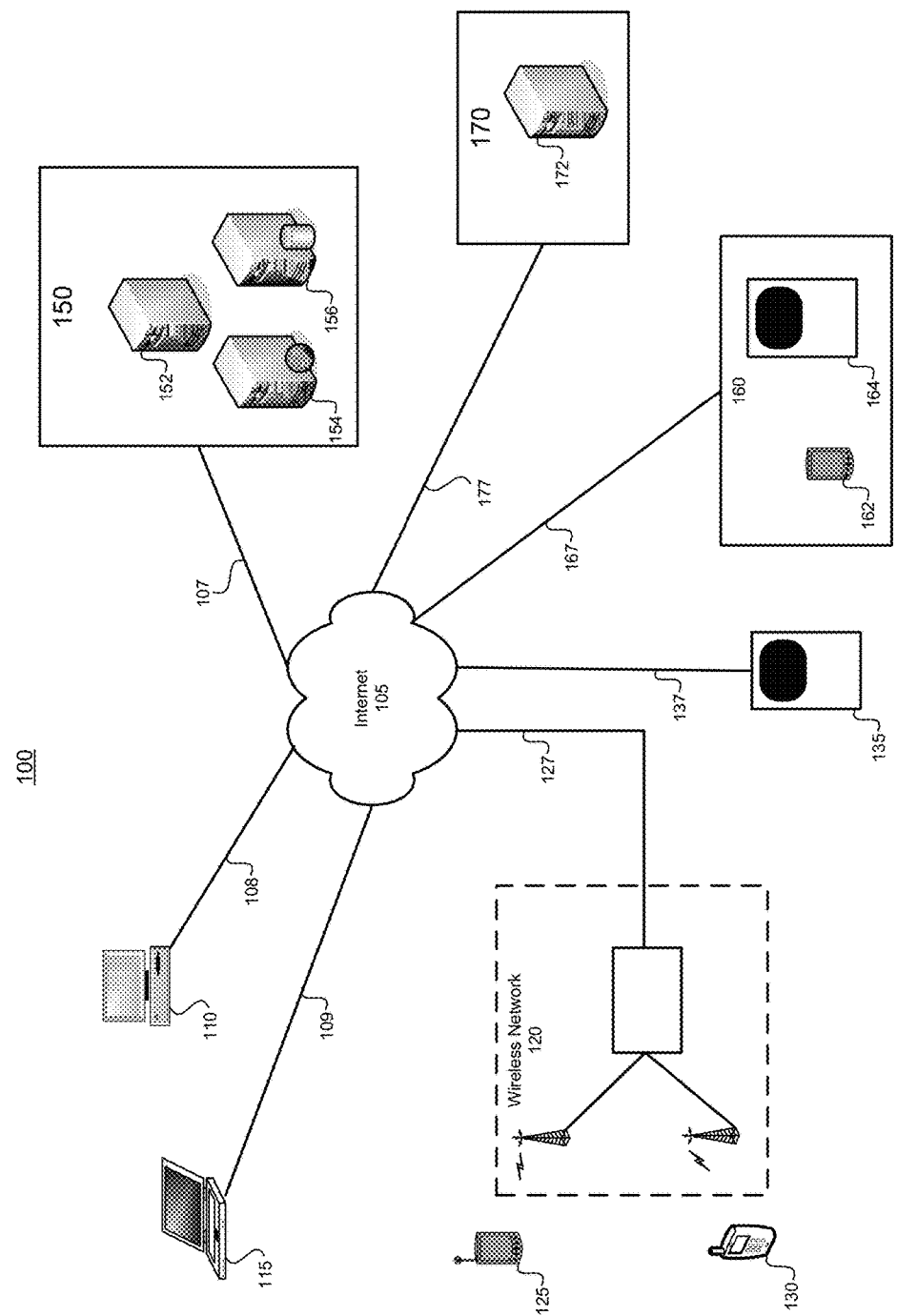
FIG. 1 is a block diagram of an exemplary system on which a representative embodiment of the present invention may be practiced.

Aspects of the invention relate to systems and methods supporting access to additional user selected functionality within an application on a user device. More specifically, certain embodiments of the present invention relate to methods and systems that provide an integrated user interface experience for non-native applications selected by a user and accessed from within a user-installed native application on a user communication device.

A representative embodiment of the present invention may be used in conjunction with any computer system that supports serving of web pages to user clients such as, for example, a web browser like Internet Explorer® from Microsoft Corporation, Google Chrome®, Safari® from Apple Inc., or Mozilla Firefox® and the user installation of applications or "apps" upon user communication devices such as, for example, the Apple iPhone™, those based upon the Android Operating System (OS), or user devices employing any other operating system that supports the installation of native applications or "apps". Aspects of a representative embodiment of the present invention may be employed on a single computer system or may be distributed between or among a plurality of computer systems, which may be interchangeably referred to herein as a web site, a social commerce platform, an e-commerce platform, or an e-commerce web site. Such a platform may be used to support user social interaction and commerce via the Internet.

U.S. Provisional Patent Application No. 61/700,754, entitled "APPLICATIONS ON TOP OF AN E-COMMERCE SITE," filed Sep. 13, 2012, which is hereby incorporated herein in its entirety, describes representative embodiments of inventions that enable the creation of applications within an e-commerce web site, and that enable those other than the operator/sponsor of the web site (e.g., third party developers) to enrich and enhance the user experience of the web site and to provide additional services, features and capabilities than are provided by the core web site technology. Such representative embodiments enable distributed and/or crowd-sourced development (e.g., by third-party developers) of a web site, to inject content and capabilities into the web site. For example, various embodiments of the inventions described in U.S. Provisional Patent Application No. 61/700,754 enable a third-party to add pages inside of a web site, to display user-interface elements ("UI elements") such as, for example, user selectable/clickable "buttons," and links, and to display banners and text in pages that show details for products.

Representative embodiments of the present invention enable third-parties to provide various functionality in the form of non-native or "hosted" applications installable by a user within a previously installed application native to the user communication device. The term "native application" may be used herein to refer to software applications or software programs that provide particular functionality for a user of an electronic device, and that provide that functionality using instructions directly executable by one or more processors of the electronic device. A representative embodiment of the present invention enables third-parties to innovate by providing users with a variety of what are referred to herein as "hosted applications" that may be prepared by independent $3^{rd}$ party developers and simply installed by a user within an existing, native application on a user communication device. This enables the sponsors and developers of such applications to more easily and quickly explore and test their ideas and innovations in the environment of real-life user activity. In many instances, the development and deployment of native applications for consumer communication devices such as, for example, the iPhone from Apple Inc., becomes a lengthy effort complicated and delayed by testing and certification required by the operator of the means by which the native applications are distributed (e.g., an "App Store"). A representative embodiment of the preset invention enables one to experiment and explore various additional functionality provided by a variety of developers in a more flexible and rapid fashion, by simply updating/modifying an application whose functionality may reside primarily on a server removed from the user communication device, and which is not subject to testing or certification by another organization.

It should be noted that although the following discussion may make frequent mention of the use of representative embodiments of the present invention with regard to web sites and applications related to activities surrounding e-commerce, the innovative concepts described herein are not necessarily specifically limited in that regard, and may be applied to web sites and applications of all types, and used for a variety of purposes, without departing from the scope of the inventive concepts revealed here.

A representative embodiment of the present invention includes a unique platform that enables the user to install additional functionality within an existing user-installed, native application on a user communication device, and enables the user to access the newly installed applications without the need to download or install a new version of the existing native application. The functionality installed within the native application may be referred to herein as a "hosted app," "hosted application," or "app."

A representative embodiment of the present invention provides application developers the opportunity and tools to develop applications that are user installable within, for example, an existing, user-installed, native application in a user device. Application programming interfaces (APIs) enable an application hosted by a native application on the user device to interface with the user device without the development of code native to the user device, and enables applications to include text, "buttons," and graphics within strategic areas of the user interface of the user device such as, in the example of an e-commerce application, in "Product Pages," "Store Locators," and other functional areas of the native application.

A representative embodiment of the present invention may be seen in methods of operating a user communication device and a communication system that enables users to customize the functionality of the communication device through the installation of one or more applications within an existing native application previously installed by the user. The users of the communication device may be, for example, customers of a business that operates or sponsors operation of an e-commerce platform, and the newly installed application may, for example, enable a user to more easily or effectively access various activities, events, or functions that may be hosted on the e-commerce platform. Some users of the e-commerce platform may be referred to herein as customer members. Such operator or sponsor of such a system may operate a loyalty program comprising such customer members.

The terms "customer," "consumer," and "user" are understood herein to refer to those that may act as an "end-user" of a web site, a mobile application or "app", or a mobile device, in contrast to those that may be considered to be developers, administrators, operators, and/or sponsors of a web site, a mobile application or "app", or a mobile device that an "end-user" may employ in order to engage in various activities including, by way of example and not limitation, e-commerce, social networking, web searching, and general web access and mobile device use.

A representative embodiment of the present invention permits a user of a communication device to customize an application on a communication device to include functionality specifically selected by the user, or that selected by the operator or sponsor of a system such as, for example, a web-based e-commerce platform. Such included functionality may, in an example of a web-based e-commerce application, enable a user to perform actions that the user/operator/sponsor wishes to be available when the user accesses the web-based e-commerce platform using a native application or browser on a user communication device, or a user client (e.g., a browser) on a laptop or desktop personal computer, for example. It should be noted that a representative embodiment of the present invention permits the applications or functionality installed on a particular communication device by one user to be the same or different than that installed on another communication device by a different user.

The following discussion of various aspects of representative embodiments of the present invention uses an example of the application of those inventive aspects in terms of features of an e-commerce web site. It should be noted that this is for the purpose of illustration to aid understanding, and that the examples do not necessarily represent specific limitations of the present invention, unless recited by the claims.

It should also be noted that, as utilized herein, the term "exemplary" means serving as a non-limiting example, instance, or illustration. Also, as utilized herein, the term "e.g." introduces a list of one or more non-limiting examples, instances, or illustrations.

FIG. 1 is a block diagram of an exemplary system 100 on which a representative embodiment of the present invention may be practiced. As illustrated in FIG. 1, the system 100 includes an e-commerce platform 150 comprising one or more web servers 154, one or more database servers 156, and one or more application servers 152. The elements of the e-commerce platform 150 may be interconnected, and may singly or as a group be connected to Internet 105 via communication link 107, which may employ any suitable combination of wired or wireless data communication links. FIG. 1 also includes personal computers (PCs) 110, 115, which are connected to the Internet 105 by communications links 108, 109, respectively, which may be any suitable combination of wired or wireless data communication links. PCs 110, 115 may be any of, for example, a desktop computer, a laptop computer, a notebook computer, a netbook computer, a tablet computer, or any other electronic device having capabilities suitable for accessing the Internet 105 from, for example, a home, a small business, or any private or public area having suitable support for communications links 108, 109.

In addition, FIG. 1 illustrates a user communication device 125 that may comprise, for example, a tablet computer, smart phone, or other handheld electronic device capable of communicating with the e-commerce platform 150 via a wireless network 120, a communication link 127, and the Internet 105. The communication device 125 of FIG. 1 may include suitable software applications, hardware, and logic to permit the communication device 125 to display received web pages and other forms of digital information on a display of the communication device 125, and suitable user interface (UI) elements to permit a user to interact with the e-commerce platform 150 using tactual, speech, and other forms of input. The communication device 125 may be capable of having native applications installed on the communication device from repositories accessible as "app stores," for example. The wireless network 120 may support communication of digital information using any suitable wireless access technology including, for example, any combination of short-range, long range, Wi-Fi, cellular, personal communication system (PCS), Bluetooth, Near Field communication (NFC), to name only a few possible air interface technologies.

FIG. 1 also includes a portable telephone 130 that may be capable of communicating over one or more of a cellular, PCS, Wi-Fi, or other wireless communication network, and may have more limited yet sufficient functionality to interact with the e-commerce platform 150 than that available from the PCs 110, 115 and the communication device 125.

In addition, FIG. 1 illustrates a kiosk device 135, which may permit users in retail and public venues to access the e-commerce platform 150. The kiosk device 135 may be designed for indoor or outdoor use, and may be linked to the e-commerce platform 150 via a communication link 137 and Internet 105, as shown, or may communicate directly with the e-commerce platform 150 using any other suitable wired or wireless means. The kiosk 135 may have functionality that is equivalent, greater than, or less than the personal computers 110, 115, the communications device 125, and the cellular telephone 130.

The illustration of FIG. 1 also shows a retail establishment 160 that may, for example, be a "brick-and-mortar" business associated with the operator or sponsor of the e-commerce platform 150. The retail establishment 160 may include a kiosk 164 that may support access to the e-commerce platform 150 from the retail establishment 160, for those users that are located within the retail establishment 160. The illustration of FIG. 1 also includes a communication device 162 that may belong to, or be loaned to a customer of the retail establishment 160, permitting the customer to, for example, electronically access information about products and/or services available at the retail establishment 160, at other business locations of the operator of the retail establishment 160, or at other businesses operated by, for example, the operator, or businesses that partner with the operator of the e-commerce platform 150. Communication devices within the retail business 160 such as, for example, the communication device 162 and the kiosk 164 may communicate with the e-commerce platform 150 via the Internet 105 and the communication link 167, which may be, for example, any suitable combination of wired and/or wireless communication technologies.

In addition, the system 100 of FIG. 1 includes an application/web server 170 that may, for example, be operated by a third-party provider of applications selectable by users of the e-commerce platform 150, and that may be arranged to interact with elements of the e-commerce platform 150, as described more fully below. In a representative embodiment of the present invention, a computer system such as the application/web server 170 may perform most or all of the actions needed to provide the functionality of the applications selected by the end-user and those added to the native application resident on the communication device of the user.

In accordance with a representative embodiment of the present invention, the elements of a system such as the e-commerce platform 150 of FIG. 1, for example, may include the functionality in a software application that enables user membership in a loyalty program of a business operator or sponsor of the e-commerce platform 150, and the engagement of users in various events and the activities. The e-commerce platform 150 may include a software platform which tracks social interactions of users, and may track the activities of each member of the loyalty program. The tracking capabilities may include a flexible interaction tracking framework that supports multiple social interactions of the members. In addition, the software application may support interfacing a variety of user communication devices including, for example, tablet, desktop, notebook, notepad, and network computers, cellular telephone and smart phones, public and private kiosks, and other suitable electronic user communication devices available at the present time or in the future.

The e-commerce platform 150 may also include suitable software, hardware, and/or suitable logic of an application that provides functionality supporting registration of user-selectable applications with a system such as, for example, the e-commerce platform 150, and user selection of one or more such registered applications to be associated with the user and to be installed on a communication device of the user. Such applications may, for example, be native applications executable on the communication device, and that interact with the hardware and/or operating system of the communication device. In addition, a system such as the e-commerce platform 150 may interact with the application/web server 170 to enable user installation of applications within a native application present on the user communication device. Such user selected and installed applications accessible within a native applications on the communication device of the user may, for example, engage functionality running on the application/web server 170. The functionality that supports the user-installed applications within a native application may, for example, interact with, access, and/or modify information such as, for example, information about user(s) of the e-commerce platform 150 that may present on the e-commerce platform 150. For example, in a representative embodiment of the present invention, a user-selected application installed within a native application of the user communication device, when accessed by a user, may activate application functionality on a third party system such as the application/web server 170. The third party system may then communicate with the e-commerce platform 150 to access various information including, by way of example and not limitation, information about that and/or other users, or other information accessible via the e-commerce platform 150.

A representative embodiment of the present invention enables a user of a communication device such as, for example, the communication devices 125, 162, supported by a system such as, for example, the e-commerce platform 150 of FIG. 1 to select one or more applications for installation within a user-installed native application present on the communication devices 125, 162.

The screen area of a communication device such as, for example, the communication devices 125, 162 of FIG. 1 may be divided into a number of geometric regions including, for example, a header portion and a canvas portion. In a representative embodiment of the present invention, the header portion may be under control of the native application or operating system of the communication device. In a representative embodiment of the present invention, upon selection/clicking of, for example, an icon or link activating a user installed application or "app" hosted by the native application, an area of the display screen of the user communication device that may be referred to herein as a "canvas" may be under the control of the selected app, the functionality of which may reside primarily at the server supporting the app such as, for example, the application/web server 170 of FIG. 1, to permit the application to interact with the user of the communication device, and to perform actions involving a system such as the e-commerce system 150, for example.

Applications available for user selection may, for example, be prepared by any of a number of third-party developers in cooperation with the provider of the hosting native application for the communication devices 125, 162. In a representative embodiment of the present invention, the provider of the hosting native application may be the operator/sponsor of the e-commerce platform 150 for example, and portions of the functionality of the such hosted applications or "apps" may be implemented on a system such as, for example, the application/web server 170 of FIG. 1. In a representative embodiment of the present invention, a system such as, for example, the application/web server 170 may be communicatively linked to a system such as, for example, the e-commerce platform 150 via the Internet 105 or, for example, a dedicated communication path (not shown). Following development, such hosted applications or "apps" may, for example, be made available by the app developer to users of communication devices on which the native or hosting application is already installed, through a process that may be referred to herein as "registration."

Figure 2:
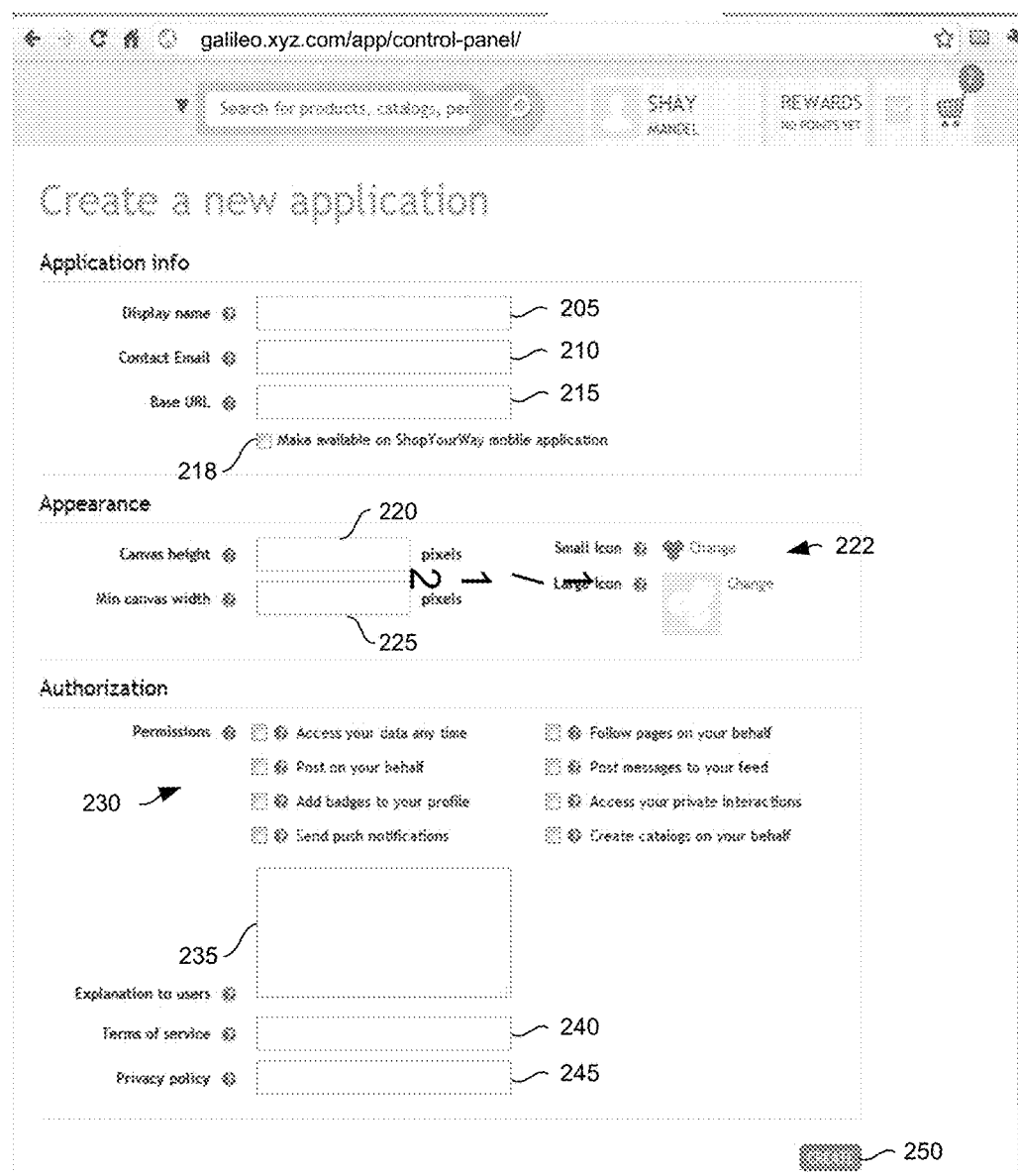
FIG. 2 is an illustration of an exemplary application registration screen, in accordance with a representative embodiment of the present invention.

The registration of a hosted application or "app" with a system such as the e-commerce platform 150 may be made by a member of the organization that developed the hosted app, and may be a one-time occurrence for each web site on which the hosted app is to be made available. An example of a web-based form for registration of a user selectable application is shown in FIG. 2, which is discussed in further detail, below. As illustrated in FIG. 2, the registration of the hosted app with, for example, the e-commerce platform 150 may involve the submission to the e-commerce platform 150 of a number of parameters including, for example, a name and/or a "display name" for the hosted app, an icon or graphical image for the application, strings of text to accompany icons or graphical images, and a description of the hosted app, to name just a few parameters. Registration may also involve collection of information about the organization/company wishing to register the hosted app, which may include, among other things, details about the registering organization, information (e.g., an email address) to enable contact with those responsible for the application, and a "base universal resource locator (URL)" that may identify the system or server from which the hosted application is supported and/or from which content or web pages for the hosted app are served, which may be a system such as, for example, the application/web server 170 of FIG. 1.

In a representative embodiment of the present invention, additional information that may be submitted as part of registration of a user-installable hosted application may include, for example, attributes for what may be referred to herein as a "canvas." The term "canvas" may be used herein to refer to a portion of the screen of a mobile device such as, for example, the communication devices 125, 162 upon which information related to and under the control of the hosted app may be displayed. In a representative embodiment of the present invention, the "canvas" may be UI element that is opened or activated by the native application. The UI element that implements the portion of the screen(s) of the user communication device referred to herein as a "canvas" may be capable of displaying web page content, and may be activated upon user selection/clicking of a UI element linked to the server supporting the hosted app (e.g., the application/web server 170). In some representative embodiments of the present invention, such functionality may be provided by, for example, a "web view" fed with, for example, hypertext markup language (HTML) content provided from the server supporting the functionality of the hosted app (e.g., the web/application server 170), and hence within the full control of the code for the hosted app that runs on the server. A "canvas" may be used by the hosted app to display most of the custom UI elements employed by the hosted app to interact with the user. Registration of an application may also include supplying information about various attributes such as, for example, caption(s) for one or more UI element(s) to be shown in various screens of the native application in which the hosted app is installed, which may include a screen having what may be referred to herein as a "navigation menu." The attributes submitted at registration of a hosted app may also include a "base URL", and size information for the portion of the screen (e.g., PhoneGap WebView) of the user communication device that will be used to display the "canvas," discussed above.

The "navigation menu" portion of one or more screens of the native application, introduced above, may be a designated geometric region of one or more screens that is used, among other things, to display UI elements such as text/icons/graphical navigation links that represent one or more hosted app(s) installed within a native application on the communication device. Such UI elements may be registered with a system such as, for example, the e-commerce platform 150, so that the registered UI elements representing hosted applications may be made to appear on various screens of the native application. The caption on each of the UI elements may be static, and may be set when the UI element and its corresponding hosted app are registered with, for example, the e-commerce platform 150. At the time of registration of the hosted app with the e-commerce platform 150, the registration may identify one or more "links," "buttons," or other UI elements. In a representative embodiment of the present invention, information about each such UI element may be retrieved from the e-commerce platform 150 at start-up of the native application running on the user communication device. In accordance with a representative embodiment of the present invention, such retrieved information may cause the native application to add one or more links, buttons, and/or other UI elements to various screens of the native application such as, for example, a screen containing the "navigation menu" portion mentioned above, or other suitable screens of the native application. In a representative embodiment of the present invention, the order or arrangement of the displayed UI elements within various portion of the user interface of the native application may be automatically determined by a system such as the e-commerce platform 150 based on, for example, the usage patterns of the user, or may be determined by the native application.

When a canvas for a hosted app is opened, loaded, or refreshed in a representative embodiment of the present invention, a call may be made to the "base URL" that was identified during registration of the hosted app. A parameter value that identifies the user (e.g., a user ID) may be appended to the base URL, as context for "canvas code" that runs on the system of the developer of the application (e.g., the application/web server 170 of FIG. 1). Any content returned from the call to the base URL may then be presented to the user within, for example, the canvas portion (e.g., a PhoneGap Webview) of the screen of the user communication device (e.g., communication devices 125, 162 of FIG. 1). In a representative embodiment of the present invention, the call to the base URL may not return a response to redirect, but instead may return the actual content to be displayed within the canvas portion of the screen (that is, to be displayed in the WebView). Any ensuing interaction of the user with the canvas may take place only within the canvas, and the user may not be permitted to interact with the surrounding screen. Any state or context information that may be needed at a later time related to the activities of the user may, for example, be saved on the system of the developer of the hosted app (e.g., the application/web server 170).

Upon successfully registering a hosted app with a system such as, for example, the e-commerce platform 150, the organization responsible for the hosted app (e.g., the application/web server 170) may be given an "app identifier (ID)" and other information used to uniquely and securely identify and authenticate the hosted app in its interactions with a system such as the e-commerce system 150, for example, an "application secret key." Additional details concerning these elements are presented below.

The server residing at the base URL (e.g., the web/application server 170 of FIG. 1) may have a number of different "integration points" with the system with which the hosted app is to interact such as, for example, the e-commerce platform 150. For example, in one representative embodiment of the present invention, the base URL of the application/web server 170 may be "http://myapp.com," and at least one web page may exist at "http://myapp.com/landing" that is shown as a "landing page" for the hosted app. The term "landing page" may be used herein to refer to the first web page served when accessing a given URL such as, for example, a web page that may be encountered by a user when a user selects to install a hosted app on their communication device.

Following registration of the hosted app with the system through which the app is to be made available, (e.g., the e-commerce platform 150), the availability of the hosted app may be made known to current/potential users. This may involve adding one or more UI elements (e.g., text, links, buttons) for the hosted app to one or more web pages including, for example, the web pages of an "app store" that may, for example, appear on a web site supported by the e-commerce platform 150. The availability of the hosted app may also be made known through links or URLs identified in conventional advertisements in printed media, and through the use of targeted electronic communication such as, for example, email or a text messages containing a link to the landing page of the base URL for the application.

A user interested in the hosted app may select/click on a published link for the app, which may then take the user to the landing page for the hosted app. In a representative embodiment of the present invention, the landing page may be what is referred to herein as a "glass-wall page," which may permit a user to view the contents of the landing page without being "logged in." The user may not, however, be able to access objects on the landing page, if login is required. In a representative embodiment of the present invention, a portion of the landing page for the hosted app may be served from a web site supported by a system such as the e-commerce platform 150, while other portion(s) or all of the landing page may be served and under the full control of a system of the organization responsible for development/support of the hosted application such as, for example, the operator/sponsor of the application/web server 170 of FIG. 1.

The hosted app selected for installation by the user may require login, which may be the case for those apps in which additional information about the user may be desired. If the user is not already logged in to the e-commerce platform 150, the user may be directed to a "login page," through which the user may login using, for example, a user identifier and a password. If, however, the user is unable to login because the user is not already signed up with the operator or sponsor of the e-commerce platform 150, the user may be presented with a form to permit the user to "join" or "sign up" to be a member (e.g., of a "loyalty program"). Sign-up of the user may include displaying an "approval screen" for the application to the user. The "approval screen" may list basic information about the application, and may request that the user agree to certain "Terms and Conditions," to review a "Privacy Policy" for the application, and to approve installation of the hosted app on their behalf within the native application residing on the user communication device. Information identifying the hosted app being installed, user responses to questions, and user agreement with various conditions may be recorded in a "user profile." The information gathered may be authenticated and/or stored by a system such as the e-commerce platform 150 of FIG. 1 for example. After successfully completing the login process, or if login is not required, the user may then be taken to a web page for the hosted app selected by the user.

In a representative embodiment of the present invention, the process of "installation" of a hosted app may involve a system such as, for example, the e-commerce platform 150 storing information about the request to install the selected host app by the user. The installation of the hosted app may also involve the storage of a record of details about the user that installed the hosted app, on the system supporting the selected host app such as, for example, the application/web server 170. Such details about the user may be accessed from the e-commerce platform 150 by the application/web server 170 using an API provided by the e-commerce platform 150.

Once the hosted application selected by the user has been successfully installed on the user communication device, UI elements may be added on designated screens of the native application and/or aspects of screens of the native application may be modified to include UI elements such as, for example, links, icons, and/or buttons representing and enabling access to the functionality of the hosted apps that have been installed for the user of the communication device. In some representative embodiments of the present invention, executable code such as, for example, JavaScript® code related to the hosted app may also be made accessible to or inserted within the digital representation of the native application. Information about the hosted apps currently installed for the user of the communication device may be stored and maintained in memory of a system that interacts with the native application on the user communication device such as, for example, in a database on the e-commerce platform 150 of FIG. 1. Later, as the user communication device interacts with the native application, the user may make use of the UI elements for the hosted app that were added to the user interface of the native application when the native application was opened, to access the additional functionality available via the hosted app(s).

In some representative embodiments of the present invention, the screen areas of the native application used to display UI elements related to and/or representative of the installed hosted app(s) may at times be collapsed, and may be opened or expanded by the user by, for example, user contact with a touch sensitive surface of the display of the user communication device. In some representative embodiments of the present invention, a system such as the e-commerce platform 150 may, for example, unilaterally install one or more hosted app(s) and related UI elements within native applications of some user communication devices. In some representative embodiments of the present invention, the UI element(s) related to and/or representative of the hosted apps installed by a system (e.g., the e-commerce platform 150) may, for example, be visible on screens of the native application only until the user of the communication device closes the native application.

In a representative embodiment of the present invention, a system such as the application/web server 170 may register one or more particular UI element(s) with a system such as, for example, the e-commerce platform 150. The one or more particular UI element(s) may be used to represent a corresponding installed hosted application on screens of a native application on the user communication device. The UI elements may include, by way of example and not limitation, images, links, icons, and/or "buttons" to be displayed on designated screens of an existing native application previously installed by the user. Information about the installed hosted apps, buttons, text, links, and other UI elements registered with and recorded by the system (e.g., e-commerce platform 150) may be retrieved by the native application upon the user selecting/opening the native application on the communication device. For example, in accordance with a representative embodiment of the present invention, the opening of a native application installed on a user communication device (e.g., the communication devices 125, 162 of FIG. 1) may cause the native application to establish communication with a system such as, for example, the e-commerce platform 150 of FIG. 1, and to retrieve various types of information and parameters for one or more hosted app(s), to permit the native application to display on various screens, UI elements and information corresponding to the one or more hosted app(s), thereby enabling user access to the functionality of the installed hosted app(s). Once displayed on a screen of the native application, the UI elements for any hosted app(s) permit the user to access the functionality of the hosted app(s) from within the native application.

In a representative embodiment of the present invention, the registration of UI elements for a hosted application with the e-commerce platform 150 may be a "one-time" operation performed by the application/web server 170 during the installation of the application. The registration of the UI element for a hosted app may be performed using what may be referred to herein as a "backend API" of a system such as the e-commerce platform 150, for example.

In a representative embodiment of the present invention, a system such as the e-commerce platform 150 of FIG. 1 may enable user access to one or more user-selected hosted apps, by arranging for the appearance of one or more UI elements on designated screens of a native application residing in a user communication device. In one representative embodiment of the present invention, particular portions of various screens may be reserved for the display of the UI elements corresponding to each of one or more user-selected hosted apps.

When a user views a screen of a native application on which a selectable/clickable UI element (e.g., icon, text, button) for a hosted app is displayed, the user may choose to select/click the UI element to perform the actions associated with the corresponding hosted app. In accordance with a representative embodiment of the present invention, selecting/clicking the UI element associated with a hosted app may initiate the execution of executable code on the user communication device such as, for example, JavaScript® code that may, among other things, open a UI element on the screen of the communication device that may render content for the display to the user. While such a UI element may render information encoded in a form such as, by way of example and not limitation, hypertext markup language (HTML), in the same manner as a web browser (e.g., Internet Explorer® from Microsoft Corporation, Google Chrome®, or Safari® from Apple Inc., the UI element may not provide full functionality of a web browser. The opening of such a UI element may cause a call to be made to a server for the hosted app corresponding to the UI element selected/clicked by the user, and may cause activation of executable code supporting the actions of the hosted app, on the server. The UI element rendering content to the screen of the communication device may then, in some cases, be under the full control of the code on the server corresponding to the hosted app associated with the UI element selected by the user. As previously discussed, the server that supports the functionality of the hosted app may be identified by and accessed using a "base URL" submitted when the hosted app was registered by the application developer (e.g., the operator of application/web server 170) with the system that interacts with the native application on the communication device in which the UI element(s) for the hosted app will be made to appear, in this example, the e-commerce platform 150.

In a representative embodiment of the present invention, the system that interacts with the native application, such as for example, the e-commerce platform 150 of FIG. 1 may enable the system operated by the developer of a hosted app (e.g., the application/web server 170) to communicate directly with the users of the hosted app, even when the users are not actively using the canvas displayed by the hosted app. Other forms of communication with users is supported by a representative embodiment of the present invention. For example, a representative embodiment of the present invention may provide the needed functionality in an API of the e-commerce platform 150 to permit publishing content to a "newsfeed" of a user on a social networking web site, thereby enabling social interaction between users. A "newsfeed" for a user may be embodied as an area of a web page for the user that permits other users to add information that may be private, for only the owner of the web page to view, or public, for viewing by all users having permission to view the web page. The "newsfeed" may act as a central component in the social interaction of users, whether related to e-commerce or not, and users may receive in their "newsfeed" system generated offers and recommendations, as well as social activities and information from people they follow.

In order to permit hosted apps to modify the experience of users interfacing with a user-installed native application, or interfacing with a web site such as that supported by a system such as, for example, the e-commerce platform 150, the API provided by such a system provides for the developer of a hosted app to communicate personalized messages to users. Such messages may be private, and may, for example, include targeted offers or personalized recommendations tailored to specific users. Such offers may be displayed as private stories on the user's newsfeed, which only the user may be able to view. Then, if the user chooses to, the user may actively share such private stories with their friends and followers.

In a representative embodiment of the present invention, the tools of an API of a system such as the e-commerce platform 150, for example, enable the executable code supporting a hosted application on the system of the application developer (e.g., the application/web server 170) to publish to the "newsfeed" of the user what may be referred to herein as a "story" by sending, to the e-commerce platform 150, an "application secret key" that was provided to the developer system at the time of registration of the hosted app. In a representative embodiment of the present invention, the user to whom the "story" is directed may be required to have the hosted app installed on their communication device at the time of API call. The API call from the code for the hosted app on, for example, the application/web server 170, to a system such as the e-commerce platform 150 may, for example, provide the application secret key, a User ID for the user to whose "newsfeed" the "story" message is to be delivered, and specific message fields. The "story" message may then be rendered on the newsfeed of the identified user as a "system story," which may be indicated in the newsfeed by the presence of, for example, an icon associated with the hosted app, and the name of the hosted app sending the message, as the "story name." Stories published to the newsfeed of a user in this manner may be acted upon by the user like any other story, that is, they may be shared, they may be hidden, or they may allow the viewer to "see more . . . ."

In addition to the publication of private stories as described above, a representative embodiment of the present invention may enable applications to post a public story on behalf of a user, if the hosted app has been granted appropriate permission(s). The publication of public stories may include instances where users choose to share their activities with their followers, or share achievements the user makes with regard to the hosted application. In a representative embodiment of the present invention, such public stories may be published in a manner similar to status updates by the user.

FIG. 2 is an illustration of an exemplary application registration screen 200, in accordance with a representative embodiment of the present invention. As discussed above, such a user interface screen may be provided by the e-commerce platform 150 of FIG. 1, to permit the developer of an application to be hosted within a native application to register the hosted app with a system such as, for example, the e-commerce platform 150. As illustrated in FIG. 2, the registration of the application with the e-commerce platform 150 may involve the submission to the e-commerce platform 150 of a number of parameters including, for example, a display name 205 for the hosted application, an icon or graphical image 222 for the hosted application, and a description 235 of the hosted application. Registration may also involve information about the organization/company wishing to register the hosted application, which may include, among other things, details about the registering organization including, but not limited to, information (e.g., an email address) for a contact email 210 for the person responsible for the hosted application, and a base universal resource locator (base URL) 215. As described above, the base URL 215 may be used to identify the server from which the system supporting the application serves its web pages, or that supports the functionality of hosted apps, which may be a system such as, for example, the application/web server 170 of FIG. 1.

In a representative embodiment of the present invention, additional information that may be submitted as part of registration of an application may include, for example, attributes for what was referred to herein as a "canvas" including, but not limited to, the canvas height 220 and a minimum canvas width 225. As mentioned above, a canvas may be used by the hosted app to display most of the custom UI elements employed by the hosted app to interact with the user. Registration of an app to be hosted by a native application may also include supplying information about attributes such as, for example, caption(s) for any UI element(s) to be shown in the screens of the native application, such as those representing installed apps that may be displayed in a "navigation menu," as discussed above.

Registration of an app to be installed within a native application in accordance with a representative embodiment of the present invention may also include, by way of illustration and not limitation, the specification of a number of permissions 230 required by the hosted app to perform some of the functions of the hosted app. These may include, by way of example and not limitation, requesting user agreement that the hosted application may access their data at any time, that the hosted application may post messages on their behalf, and that the hosted app may add badges to the user's profile. The permissions to be solicited may also include user agreement that the hosted app may send push notifications to the user, that the hosted app may "follow" certain web pages on behalf of the user, and that the hosted app may post messages to the newsfeed of the user. Finally, the permissions requested may include user agreement that the hosted app may access private interactions, and create catalogs of products on behalf of the user.

Registration of a hosted app may also involve entry of a textual description 235 to explain to the user the purpose of the hosted app. In addition, the registration may permit the entry of "terms of service" information 240, and "privacy policy" information 245, that may be presented to the user and to which agreement may be required, before installation of the hosted app is allowed to proceed. Once all information for the hosted app has been entered on the app registration screen 200, the information can be submitted and the hosted app registered with the e-commerce platform 150, for example, by selecting/clicking the "create" button 250.

Figure 3:
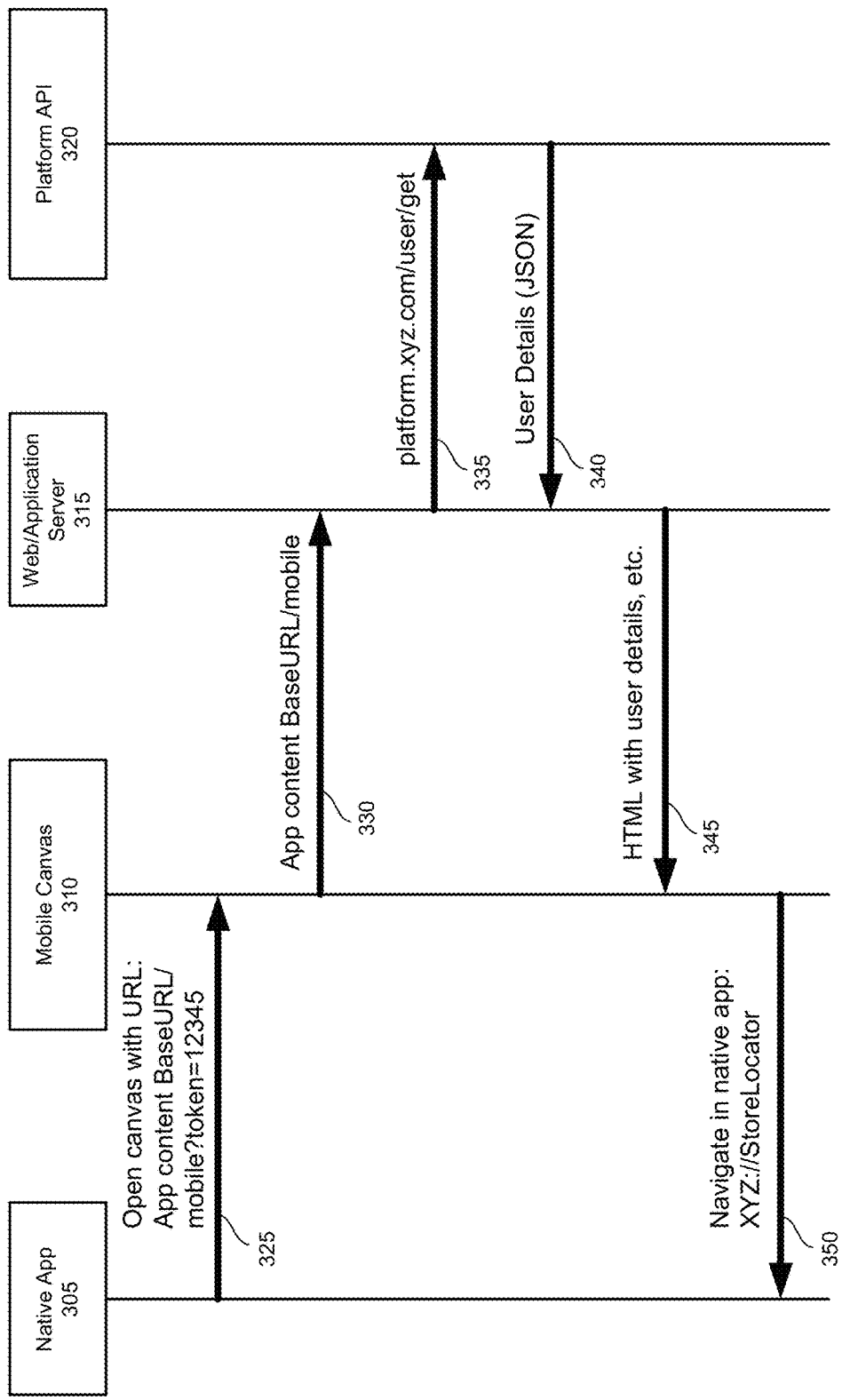
FIG. 3 is a diagram illustrating an exemplary sequence of messages communicated following user selection of a hosted app within a native application using the system of FIG. 1, in accordance with a representative embodiment of the present invention.

FIG. 3 is a diagram illustrating an exemplary sequence of messages communicated following user selection of a hosted app within a native application using the system 100 of FIG. 1, in accordance with a representative embodiment of the present invention. The illustration of FIG. 3 shows a representation of a native application 305, a representation of a mobile canvas 310 of a communication device such as the communication devices 125, 162 of FIG. 1, a representation of an application/web server 315, and a platform API 320. The native application 305 may, for example, correspond to a user installed native application running on any of, for example, the user communication device 125, the portable telephone 130, or the communication device 162 of FIG. 1.

The mobile canvas 310 may correspond to, for example, a UI element activated by the native application 305 upon user selection of a hosted app installed within the native application 305. In one representative embodiment of the present invention, such a UI element may be an instantiation of a PhoneGap WebView. The application/web server 315 of FIG. 3 may correspond to, for example, the application/web server 170 of FIG. 1, and the platform API 320 of FIG. 3 may, for example, correspond to the API described above with respect to FIG. 1 regarding the use of an API by the application/web server 170 in interfacing with the web site supported by the e-commerce platform 150.

The application-related messaging of FIG. 3 begins when a user of native application 305 selects/clicks a UI element that may appear on a screen displayed by the native application 305. The UI element displayed by the native application 305 and selected by the user may represent a hosted application that the user had previously installed either through the native application 305, as described above, or via a web page served by a system such as the e-commerce platform 150 of FIG. 1, as described in United Stated Provisional Patent Application No. 61/700,754, filed Sep. 13, 2012, the entirety of which is hereby incorporated herein by reference. The user selection of the UI element representing the hosted app causes the native application 305 to pass parameter information, represented in FIG. 3 as message 325, to a UI element (e.g., a PhoneGap WebView) supporting the mobile canvas 310, when the browser control supporting the mobile canvas 310 is opened. Opening of the UI element supporting the mobile canvas 310 causes a message 330 to be sent to the web/application server 315 that supports the hosted app, which is identified in message 330 of FIG. 3 by the "BaseURL" parameter. The message 330 passes the parameter information to the app server that supports the hosted app, identifying the user. The web/application server 315 then communicates with a system such as, for example, the e-commerce system 150, using one or more API calls, as shown in message 335, to retrieve information for the identified user.

Continuing with the example of FIG. 3, the e-commerce platform (e.g., e-commerce platform 150 of FIG. 1) then responds to the API call from the application/web server 315 with details about the identified user. The details about the identified user are returned via the platform API 320 in one or more messages, shown as message 340. In some representative embodiments of the present invention, the details about the user may be represented using JavaScript Object Notation (JSON). The application/web server 315 may respond to the receipt of the information in message 340 by sending message 345 to the UI element implementing mobile canvas 310, to populate the mobile canvas 310 for the selected application with information for the hosted app relevant to the identified user. In a representative embodiment of the present invention, the selected application on the application/web server (e.g., the application/web server 170) may then have substantially complete control over the content displayed by the mobile canvas 310. Information represented in FIG. 3 as message 350 represents calls to the native application 305 from the UI element supporting the mobile canvas 310 that may result, for example, from user actions involving the capturing of images and/or video with a camera/imaging device of the user communication device. The message 350 may also represent messaging related to the opening of a native "product page" resident on the user communication device, and registering for notification of native events such as, by way of example and not limitation, changes in physical location of the user communication device. In this manner, a representative embodiment of the present invention supports access, by a hosted application, to capabilities and functionality of a native application such as, for example, the native application 305, or other resources of the user communication device. Such capabilities and functionality may include, but are not limited to, the hosted application directing navigation to pages and/or screens of the native application designated by the hosted application, and access by the hosted app to such things as, by way of example and not limitation, cameras and image capture devices, geo-location functionality, wireless data communication capabilities, user data and parameters, and other aspects of the native application, the operating system, and the underlying hardware, software, and circuitry of the user communication device.

Figure 4:
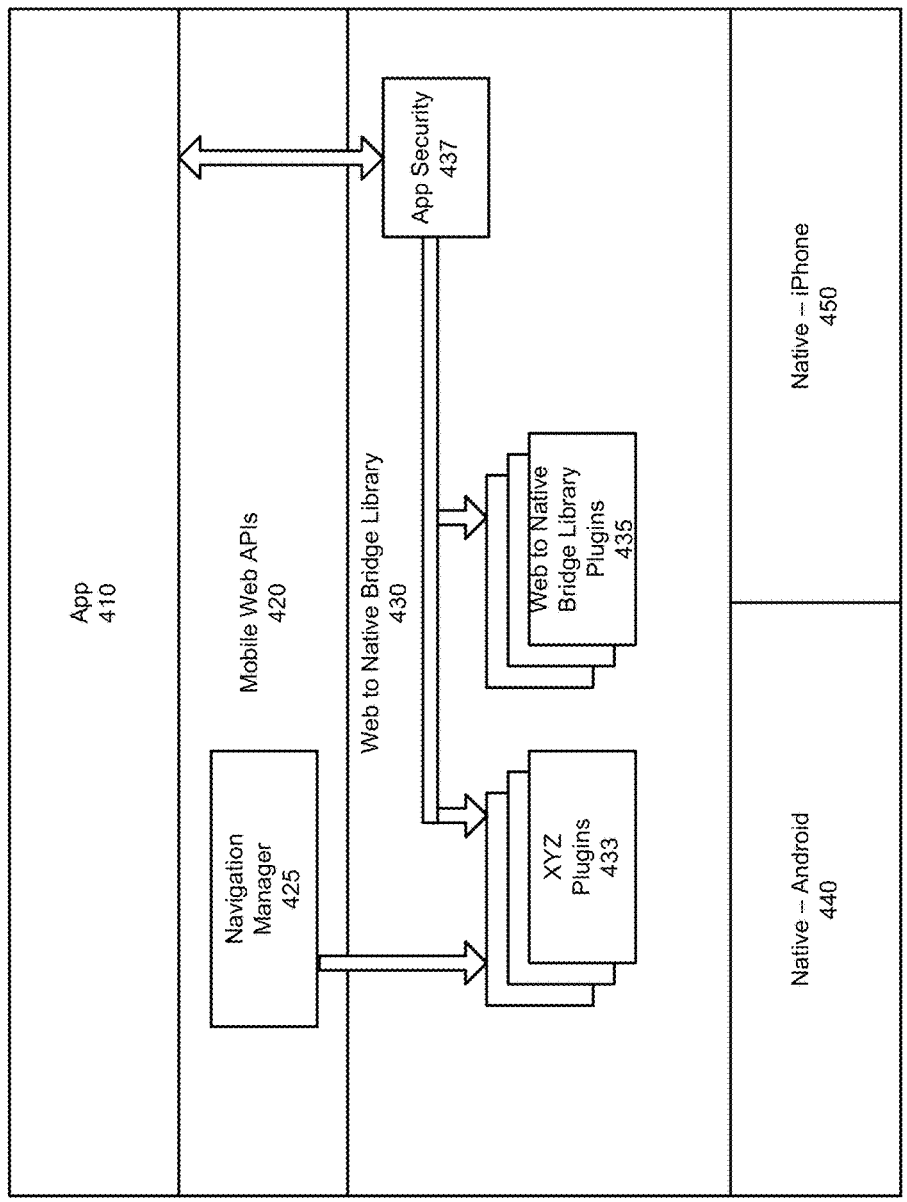
FIG. 4 illustrates an example architecture of functional elements that support installation and access to applications within a mobile application on a communication device, in accordance with a representative embodiment of the present invention.

FIG. 4 illustrates an example architecture of functional elements that support installation and access to hosted applications within a native mobile application on a communication device, in accordance with a representative embodiment of the present invention. The architecture illustrated in FIG. 4 is designed to isolate hosted applications in a manner that prevents the hosted applications from performing malicious actions against a hosting, native application. The architecture shown in FIG. 4 includes a user-installed, hosted (non-native code) application 410. In some representative embodiments of the present invention, the hosted (non-native code) application 410 may interface with a mobile web APIs layer 420 such as, by way of example and not limitation, a framework of code such as the jQuery Mobile framework. The jQuery Mobile framework is an HTML5 (HyperText Mark-up Language 5)-based unified user interface system developed under the auspices of the JQuery Foundation to work across multiple popular mobile device platforms. Additional information about JQuery Mobile may be found at "http://jquerymobile.com/." The mobile web APIs layer 420 shown in FIG. 4 includes a navigation manager 425, which allows hosted applications to use multiple pages in HTML by simulating native application navigation events between web pages by changing the contents of the web pages served by a system such as, for example, the application/web server 170 of FIG. 1. The navigation manager 425 permits hosted applications to change the title that appears on the native application navigation bar, and add one or more buttons to the navigation bar of the native application. In this way, a representative embodiment of the present invention makes the hosted application feel more like a native application.

As shown in the example of FIG. 4, the mobile web APIs layer 420 interfaces with the hosted (non-native) app 410, and with a web to native bridge library layer 430. The web to native bridge library layer 430, which may comprise what is referred to herein as the "PhoneGap" framework, interfaces with the native functionality of the user communication device. "PhoneGap" is the name given to the free and open source framework originally developed by Nitobi, now distributed by Adobe Systems. PhoneGap may be used to provide access to the Application Programming Interface (API) of iPhone (iOS-based) and Android-based devices using HTML, Cascading Style Sheets (CSS), and JavaScript. In FIG. 4, the web to native bridge layer 430 includes web to native bridge library plug-ins 435. Proprietary ("XYZ") plug-ins 433 provide functionality specifically related to the operating system used by the user communication device. In combination with the web to native bridge library, the proprietary plug-ins 433 allow a single hosted (non-native) app 410 to be installed and used on multiple hardware platforms (e.g., Apple iPhone and Android-based devices).

The web to native bridge library layer 430 also includes App Security functionality 437, which may be used to extend the logic of the web to native bridge library 430 to provide security and control over what the hosted applications such as hosted application 410 are permitted to do with respect to the native code 440, 450 of the user communication device.

In addition to the architectural elements described above, the illustration of FIG. 4 shows the native Android functionality 440, which represents the native capabilities available via the API provided by the operating system (OS) code of those user communication devices that employ the Android OS. FIG. 4 also illustrates the native iOS functionality 450, which represents the native capabilities available via the API provided by the OS code of those user communication devices that use a version of the iOS operating system, developed by Apple Inc. It should be noted that the inventive concepts described herein are not necessarily limited to use only with iOS and Android-based devices, and that FIG. 4 is merely for purposes of illustration and not limitation. Further, it should be noted that the illustration of FIG. 4 does not necessarily represent specific limitations of the present invention, unless recited by the claims.

Figure 5:
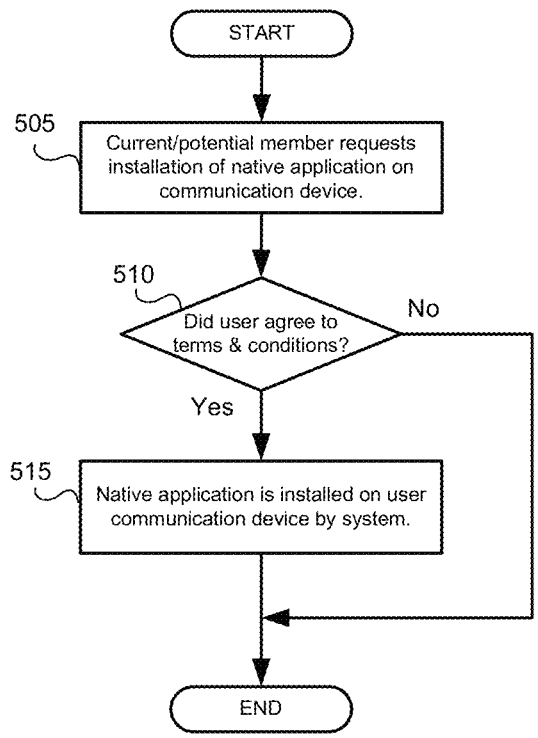
FIG. 5 is a flow chart illustrating an exemplary method of operating a system such as, for example, the e-commerce platform of FIG. 1, which supports installation of a native application on a user communication device such as, for example, the communication devices of FIG. 1, in accordance with a representative embodiment of the present invention.

FIG. 5 is a flow chart illustrating an exemplary method of operating a system such as, for example, the e-commerce platform 150 of FIG. 1, which supports installation of a native application on a user communication device such as, for example, the communication devices 125, 162 of FIG. 1, in accordance with a representative embodiment of the present invention. The following description makes reference to the elements of FIG. 1. The method of FIG. 5 begins at block 505, where a system such as, for example, the e-commerce platform 150 of FIG. 1 receives a user request for installation of a native application on a user communication device such as, for example, the communication devices 125, 162 of FIG. 1. As previously discussed, the term "native application" may be used herein to refer to software applications or software programs that provide particular functionality for a user, and that provide that functionality using instructions directly executable by one or more processors of an electronic device. Next, at decision block 510, the method of FIG. 5 may determine whether the user has agreed to the terms and conditions required for installation of the desired native application. If the user has failed to agree to the required terms and conditions, the method of FIG. 5 ends and the native application is not installed. If, however, the user agrees with the terms and conditions, the method then, at block 515, installs the native application on the user communication device. Details of the installation of native applications are beyond the scope of the present application, and will not be discussed here. It should further be noted that in some instances, such a check for agreement with certain terms and conditions, may not be made.

Figure 6A:
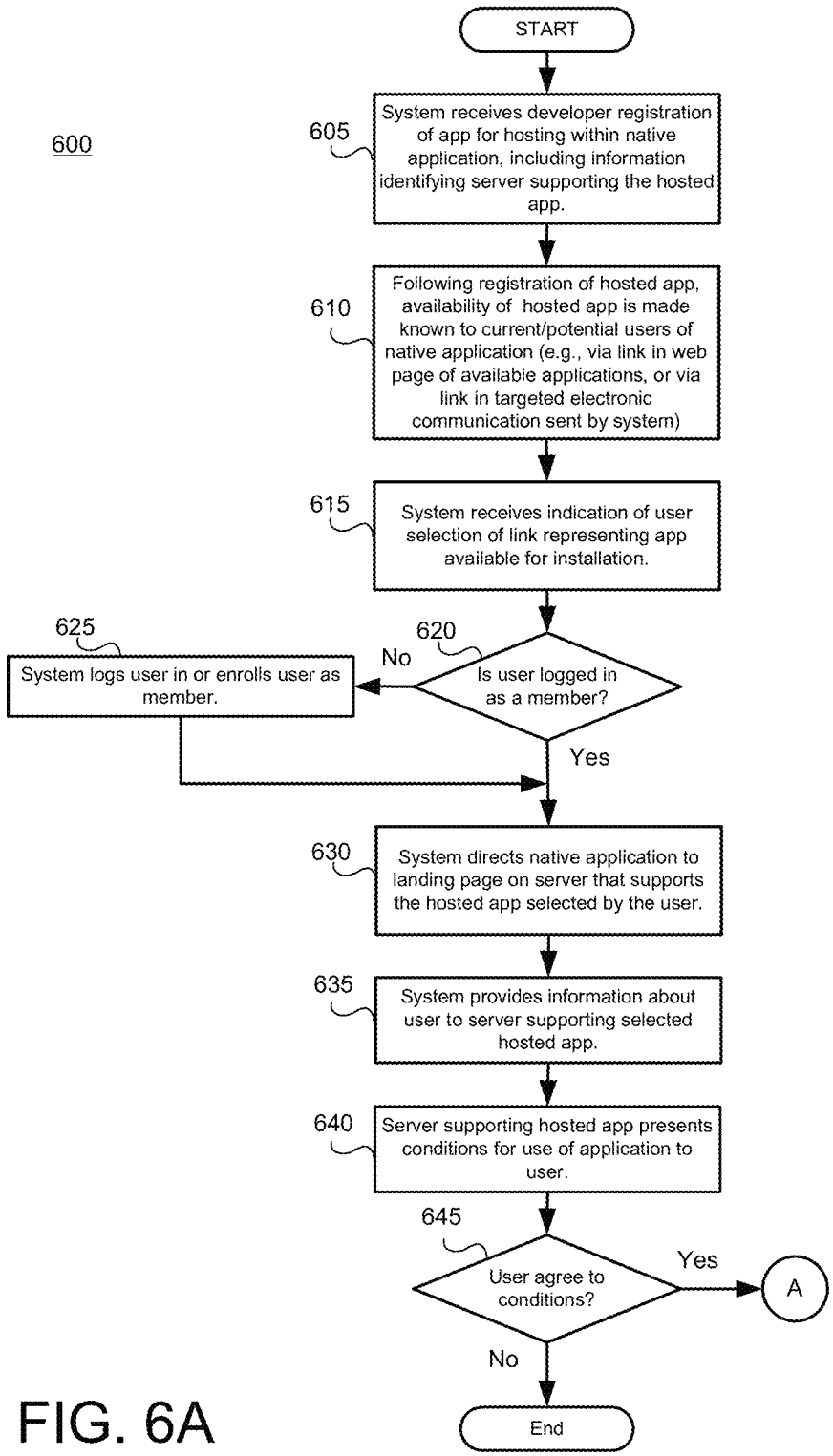
FIGS. 6A and 6B are a flow chart illustrating an exemplary method of operating a system such as, for example, the e-commerce platform of FIG. 1, that supports developer registration and user installation of applications within a native application on a user communication device, in accordance with a representative embodiment of the present invention.
Figure 6B:
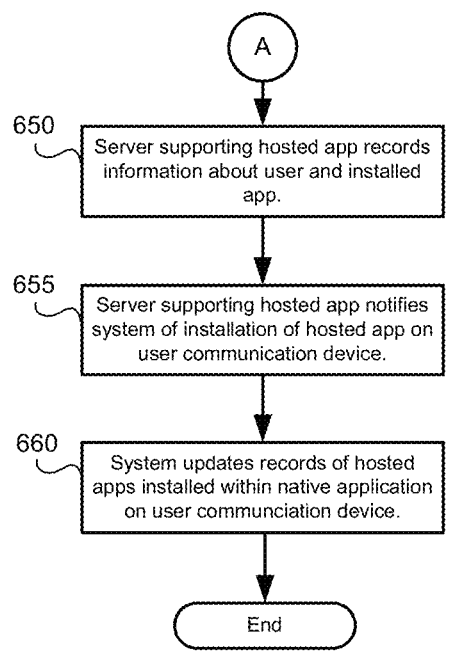

FIGS. 6A and 6B are a flow chart illustrating an exemplary method of operating a system such as, for example, the e-commerce platform 150 of FIG. 1 that supports the developer registration and user installation of hosted applications within a native application on a user communication device, in accordance with a representative embodiment of the present invention. The following description makes reference to the elements of FIG. 1. The method begins at block 605 of FIG. 6A, where a system such as, for example, the e-commerce platform 150 of FIG. 1 receives a developer registration for an application to be hosted within a native application. As described above, such a registration may include, among other things, information identifying a server supporting the hosted app such as, for example, a "BaseURL" parameter of a server like the application/web server 170 of FIG. 1, and information identifying the organization responsible for development and support of the hosted app.

Following registration of the hosted app, the availability of the hosted app may be made known to current/potential users of a native application such as, for example, via a link in a web page of available applications, or via a link in electronic communication sent by or for a system such as the e-commerce platform 150, for example. At some later point in time, a system performing the actions of FIG. 6A at block 615 may receive an indication of user selection of a link representing a hosted app available for installation. Such a link may appear, for example, in an "app store" or within electronic communication such as a received email or text message, or a web page, for example. Next, at decision block 620, the method of FIG. 6A may determine whether the user is logged in to a system such as, for example, the e-commerce platform 150, with which the existing native application communicates and cooperates. If the user is not logged in, or is not a registered member of, for example, a loyalty program of the operator or sponsor of the e-commerce system 150, the user may then, at block 625, be asked to log in, or to join as a member.

Next, at block 630, the system (e.g., the e-commerce platform 150) may direct the native application to a landing page on a server that supports the hosted app selected by the user such as, for example, the application/web server 170 of FIG. 1. The system may then, at block 635, communicate information about the user to the server that supports the hosted app. This may be done using elements of an API that may be used to interface external systems such as the application/web server 170 of FIG. 1 to the e-commerce platform 150. The method of FIG. 6A then, at block 640, presents conditions for use of the hosted app to the user of the communication device. If the user fails to agree to the conditions, the method then ends, and installation of the hosted app is not performed. If, however, the server (e.g., the application/web server 170) determines that the user has agreed to the conditions for installation of the hosted app, the method continues on to block 650 of FIG. 6B, where the server supporting the hosted app records information about the user performing the installation, and the hosted app being installed. Next, at block 655, the server that supports the hosted app notifies the system (e.g., the e-commerce platform 150) of the installation of the hosted app on the user communication device. This communication may use the API described above, for example. Finally, at block 660, the system (e.g., the e-commerce platform 150) may update its own records of the hosted apps installed within the native application on the user communication device.

Figure 7:
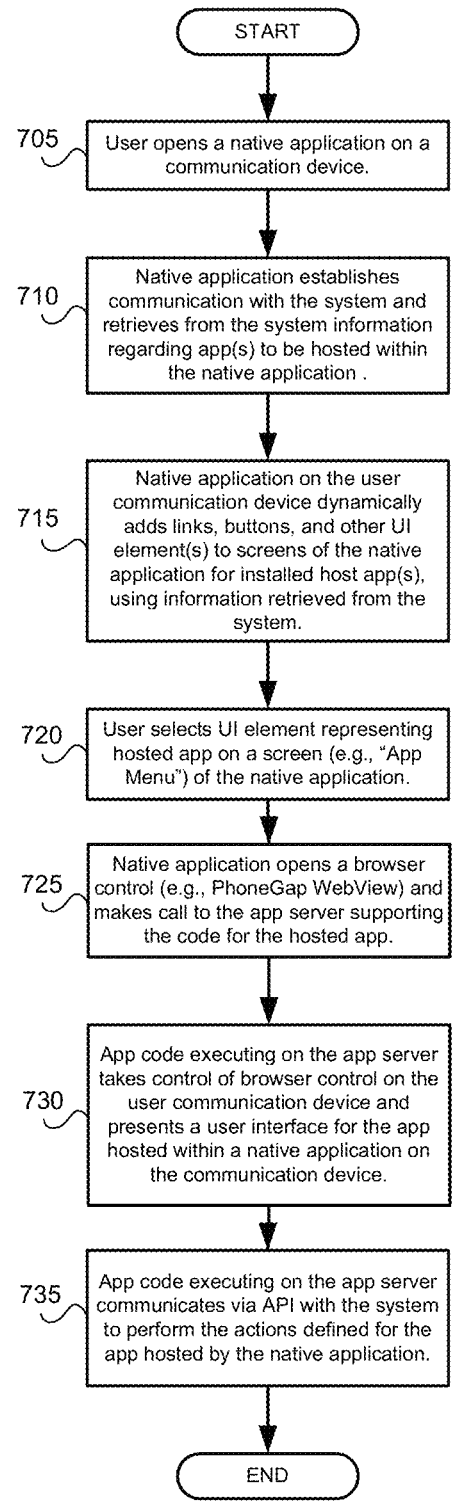
FIG. 7 is a flow chart illustrating an exemplary method of operating a user communication device such as, for example, the communication devices of FIG. 1, that supports user installation of hosted applications or "hosted apps" within a user installed native application, in accordance with a representative embodiment of the present invention.

FIG. 7 is a flow chart illustrating an exemplary method of operating a user communication device such as, for example, the communication devices 125, 162 of FIG. 1, that supports the user installation of hosted applications or "hosted apps" within a user installed native application, in accordance with a representative embodiment of the present invention. The following description makes reference to the elements of FIG. 1. The method of FIG. 7 begins at block 705, where a user opens an existing native application residing on a communication device such as, for example, the communication devices 125, 162 of FIG. 1. In a representative embodiment of the present invention, the native application may, by way of example and not limitation, be one that was installed by the user through an "app store" such as that operated by Apple Inc. or other organizations. Next, at block 710, the native application, following user startup, may establish communication with a system such as, for example, the e-commerce platform 150 of FIG. 1, and may retrieve information from the e-commerce platform 150. The retrieved information may, among other things, identify apps to be hosted within the existing native application of the communication device of the user. The information may also identify UI elements and related parameters for the hosted app(s) that are to appear on various screens of the native application. The native application on the user communication device, upon receiving the information retrieved from the system (e.g., e-commerce platform 150), may dynamically add links, buttons, and other UI element to designated screens of the native application for one or more host app(s) previously installed, using the information retrieved from, for example, the e-commerce platform 150.

At some later point in time after user installation of a hosted application, the user of the communication device may select a UI element displayed on a screen of the native application. The UI element may represent the hosted app installed on the communication device by the user. In response to the selection of the UI element, a native application in accordance with a representative embodiment of the present invention may, as shown at block 725 of FIG. 7, open a UI element such as, for example, a control able to display web page content (e.g., HTML), and make a call to the app server (e.g., the application/web server 170 of FIG. 1) that supports the executable code that performs functionality of the user selected hosted app. The call communicates a number of parameters to the app server including, by way of example and not limitation, information identifying the user that installed the hosted app. In response to the call, a server in accordance with the example method of FIG. 7 (e.g., the application/web server 170) may, at block 730, execute code that takes control of the UI element for displaying web page content, opened on the user communication device by the native application. The code executing on app server then communicates content and user inputs to/from the UI element, which presents a user interface for the app hosted within the native application on communication device, permitting the user of the communication device to perform the functions provided by the hosted app. The code executing on the server supporting the hosted app (e.g., the application/web server 170) may then, at block 735, interact with the system (e.g., the e-commerce server 150) via the aforementioned API, permitting the server supporting the hosted app to perform the actions defined for the hosted application, including those that affect information stored on and actions performed by the system (e.g., the e-commerce platform 150).

A representative embodiment of the present invention may provide a number of "integration points" for use by a third-party application including, but not limited to, "platform integration hooks," "canvases," "application canvases," or "app canvases," and a "platform API." A representative embodiment of the present invention may include app canvases that provide, for example, presence in a "navigation menu," an "application ("app") page," a "landing page," in user "login flow", in a user "newsfeed," in "product pages," in "store locator pages," in product "quick views," on "tag pages," and through the use of "name indicators," to name just a few examples.

Figure 8:
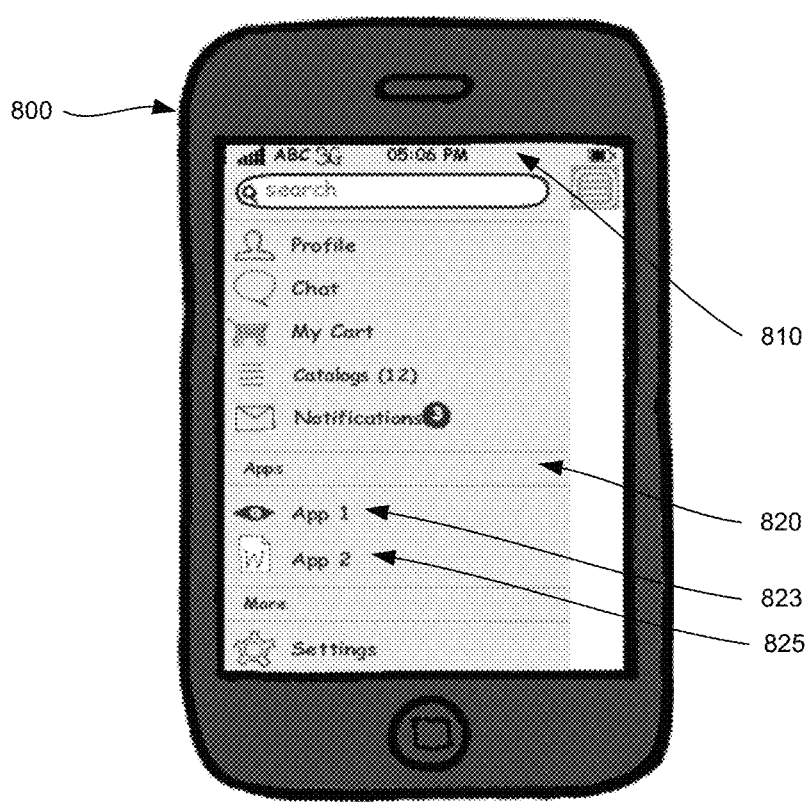
FIG. 8 is an illustration of a user communication device displaying an exemplary screen image of a native application showing UI elements representing two hosted apps, in accordance with a representative embodiment of the present invention.

FIG. 8 is an illustration of a user communication device 800 displaying an exemplary screen image of a native application showing UI elements representing two hosted apps, in accordance with a representative embodiment of the present invention. The screen image of FIG. 8 includes a header portion 810, that may be generated by the native application or by the operating software of the communication device 800, and an "Apps" portion 820 showing UI elements representing two hosted apps 823, 825 installed by a user within the native application. The UI elements for the hosted apps 823, 825 shown in the "Apps" portion 820 may be populated by the native (hosting) application upon its activation by the user, using information retrieved by the native application from a system such as, for example, the e-commerce platform 150 of FIG. 1, identifying the hosted applications installed by the user.

Figure 9:
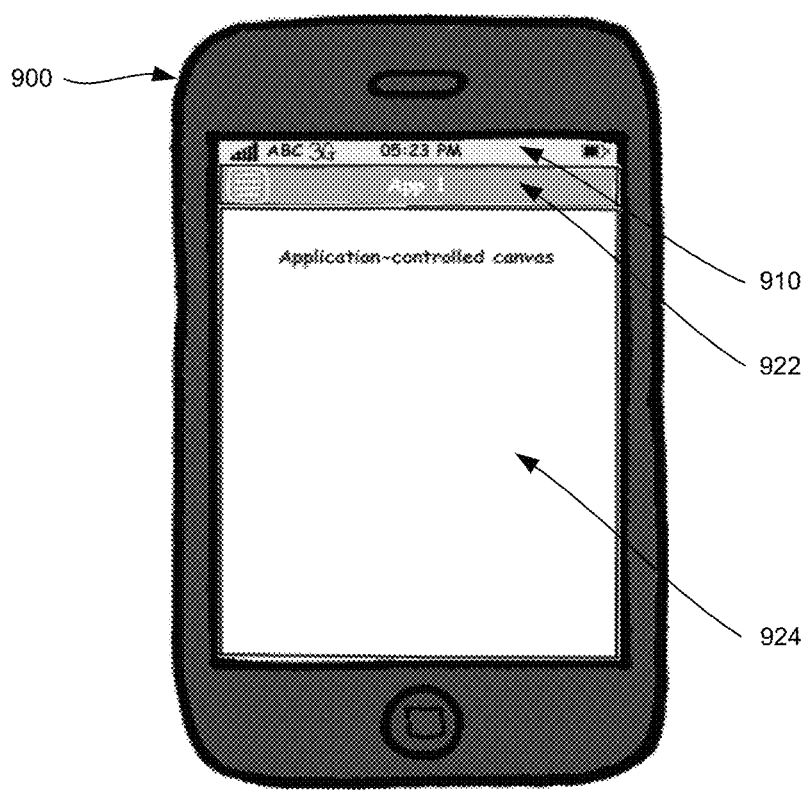
FIG. 9 is an illustration of a user communication device showing exemplary subdivisions of a screen of a communication device, in accordance with a representative embodiment of the present invention.

FIG. 9 is an illustration of a user communication device 900 showing exemplary portions 910, 922, 924 of a screen of a communication device, in accordance with a representative embodiment of the present invention. The screen image of FIG. 9 includes a header portion 910, that may be under the control of the native application or the operating software of the communication device 900, a title bar 922 that identifies the active hosted app, and a canvas 924 that is opened upon user selection of the hosted app. The UI elements and information displayed on the canvas 924, and the app-related actions performed in response to user input may be under the control of executable code at an app server such as, for example, the application/web server 170 of FIG. 1.

Figure 10:
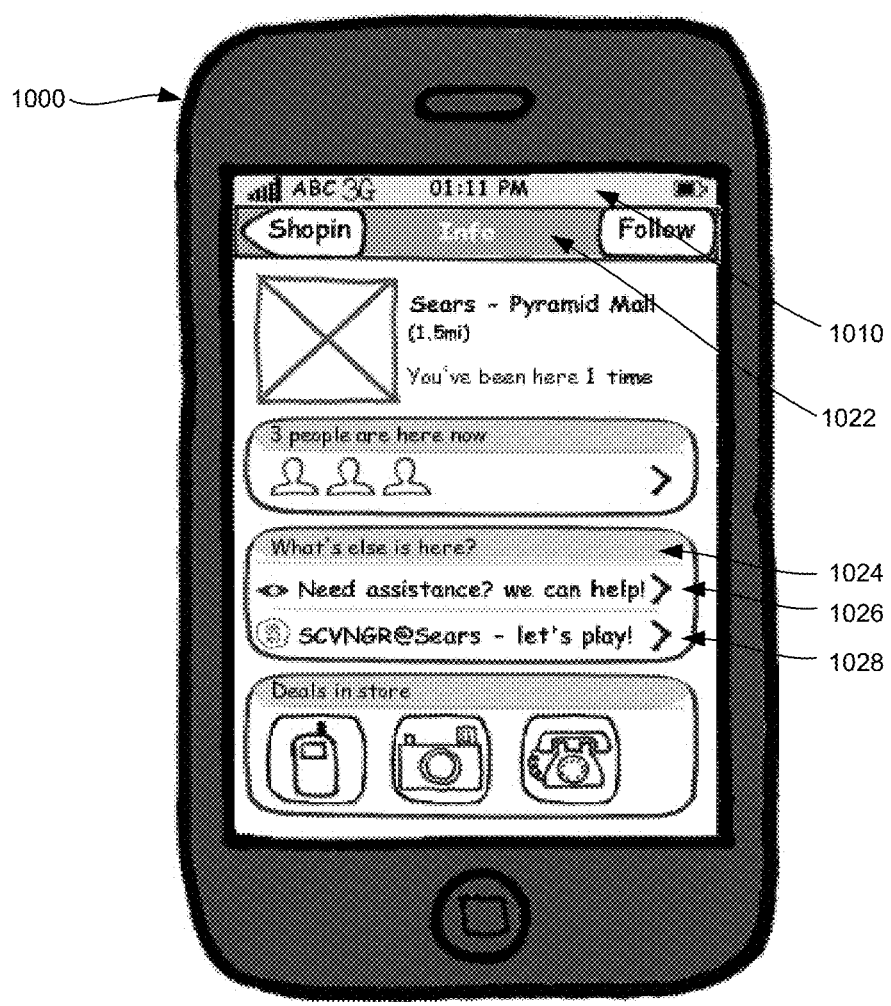
FIG. 10 is an illustration of a user communication device showing UI elements of a store information screen, in accordance with a representative embodiment of the present invention.

FIG. 10 is an illustration of a user communication device 1000 showing UI elements of a store information screen, in accordance with a representative embodiment of the present invention. The screen image of FIG. 10 includes a header portion 1010, which may be under the control of a user installed native application or the operating software of the communication device 1000, a title bar 1022 that identifies the active hosted app, and a section title 1024. Beneath the section title 1024 are shown UI elements representing a hosted app 1026 that may, for example, be installed within the native application and be used by a user of the communication device 1000 to request assistance while shopping in a retail store, and UI elements representing a second hosted app 1028. The UI elements and information representing the hosted apps 1026, 1028 shown below the section title 1024 may be displayed by the native application using information about the hosted applications retrieved from a system such as, for example, the e-commerce platform 150 of FIG. 1.

Figure 11:
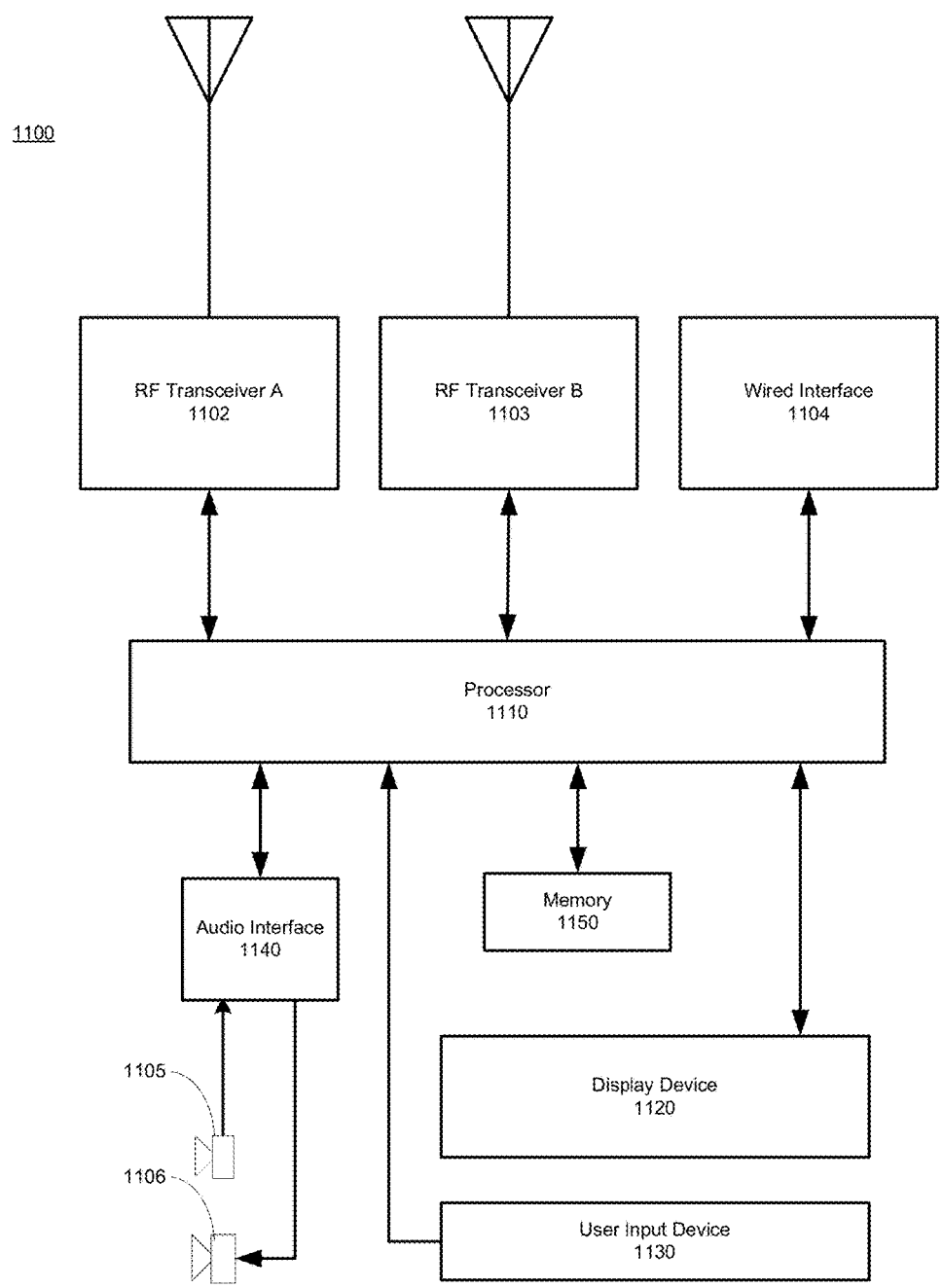
FIG. 11 is a block diagram illustrating a user communication device that may correspond, for example, to electronic devices shown in FIG. 1, in accordance with a representative embodiment of the present invention.

FIG. 11 is a block diagram illustrating a user communication device 1100 that may correspond, for example, to electronic devices shown in FIG. 1, in accordance with a representative embodiment of the present invention. The user communication device 1100 may correspond to electronic user devices such as, by way of example and not limitation, a smart phone, a tablet computer, a cellular phone, a media player, a handheld personal computer, a laptop, a notebook computer, a netbook computer, a desktop computer, a television, or any other suitable electronic device having the functionality discussed herein.

As shown in FIG. 11, the user communication device 1100 includes a processor 1110, an RF transceiver A 1102, an RF transceiver B 1103, a wired interface 1104, a display device 1120, a user input device 1130, an audio interface 1140, and a memory 1150. The processor 1110 may be, for example, a suitable microprocessor or microcomputer having sufficient computing power to control the personal electronic device 1100, and is operably coupled to the RF transceiver A 1102, the RF transceiver B 1103, and the wired interface 1104. The RF transceiver A 1102 and RF transceiver B 1103 may comprise any necessary circuitry, logic, and software/firmware for wireless communication over any of, for example, the cellular, Bluetooth, Wi-Fi (e.g., IEEE 802.11 a/b/g/n/ac), Zigbee, WiMAX, or any other wireless network known now or in the future. The wired interface 1104 may comprise any necessary circuitry, logic, and software/firmware for wired communication over any of, for example, an Ethernet, Universal Serial Bus, FireWire (IEEE 1394) or other wired networks known now or in the future.

The processor 1110 is also operably coupled to the memory 1150, and may be used for non-transitory storage of executable program instructions, parameters, and data for any of the circuitry of the personal electronic device 1100. The display device 1120 is also operably coupled to the processor 1110, and may comprise, for example, one or more LED, OLED, LCD, or other form of visual display capable of presenting text or graphics, and may comprise any circuitry, logic, or software/firmware to support, for example, a graphical user interface (GUI). The user input device 1130 may comprise, for example, suitable switches, buttons, or touch sensitive surfaces to enable user control and operation of the personal electronic device 1100, and may comprise any necessary circuitry, logic, and software/firmware to allow it to perform those functions. In a representative embodiment of the present invention, the user input device 1130 may be a touch sensitive surface at the viewing side of the display device 1120, enabling a user to use the touch sensitive surface of the display device to enter user inputs and respond to displayed information. The audio interface 1140 comprise any necessary circuitry, logic, and software to interface a microphone 1105 and a speaker 1106 to the processor 1110.

Using a representative embodiment of the present invention, a user may install the same hosted (non-native) application within native applications on multiple communication devices based on different hardware platforms and operating systems. Further, the hosted application installed by the user within a native application on their communication device(s) may also be installed as a customization to web pages accessed from a web site by the user using a conventional web browser running on a laptop, desktop, net book, or tablet personal computer. As previously mentioned, commonly owned U.S. Provisional Patent Application No. 61/700,754, entitled "APPLICATIONS ON TOP OF AN E-COMMERCE SITE," filed Sep. 13, 2012, and U.S. patent application Ser. No. 14/024,318 filed Sep. 11, 2013, which are hereby incorporated herein in their respective entireties, describe representative embodiments of inventions that enable the creation of applications within an e-commerce web site, and that enable those other than the operator/sponsor of the web site (e.g., third party developers) to enrich and enhance the user experience of the web site and to provide additional services, features and capabilities than are provided by the core web site technology.

Aspects of the present invention may be found in a method of operating a user communication device supporting installation of non-native applications within a native application. Such a method may comprise installing a user-selected native application in memory of the user communication device, and communicating a user request to a first computer system to add one or more non-native applications within the native application. The method may also include, responsive to the user, initiating operation of the native application, where the native application may communicate with the first computer system over a public network to access information enabling operation of the one or more non-native applications. The method may further comprise displaying one or more user-selectable interface elements each representing a corresponding one of the one or more non-native applications and, upon user selection of one of the one or more user interface elements, establishing a dedicated portion of the display for use by, and activating the functionality of the corresponding non-native application at a corresponding one of the at least one second computer system. The method may also comprise relinquishing control over the dedicated portion of the display to the activated functionality of the non-native application corresponding to the selected one of the one or more user interface elements.

In various representative embodiments of the present invention, the user-installed native application may comprise code directly executable by at least one processor of the user communication device, and the one or more non-native applications may not comprise code directly executable by the at least one processor of the user communication device. The information enabling operation of the one or more non-native applications may identify the one or more non-native applications and the corresponding one of the at least one second computer system that performs the functionality of each of the one or more non-native applications.

The at least a second computer system may communicate with the first computer system to access information about the user, and the first computer system may direct the native application to establish user communication with the at least one second computer system in response to the request to add the one or more non-native applications within the native application. Also, the user request to the first computer system to add one or more non-native applications within the native application may be conveyed through a web page served by the first computer system. Further, the non-native application may be enabled to one or both of access functionality of the native application and direct the native application to display a designated page or screen of the native application.

Additional aspects of the present invention may be seen in a system comprising at least one processor for communicative coupling to a display. In such a system, the at least one processor may be operable to at least perform the method described above.

Further aspects of the present invention may be observed in a non-transitory computer-readable medium having stored thereon a plurality of code sections, where each code section comprises a plurality of instructions executable by a processor to cause the processor to perform the actions of the method described above.

Although devices, methods, and systems according to the present invention may have been described in connection with a preferred embodiment, it is not intended to be limited to the specific form set forth herein, but on the contrary, it is intended to cover such alternative, modifications, and equivalents, as can be reasonably included within the scope of the invention as defined by this disclosure and appended diagrams.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of operating a user communication device supporting installation of non-native applications within a native application in memory of the user communication device, the method comprising:
   communicating a user request to a first computer system to enable operation of one or more non-native applications within a native application in memory of the user communication device;
   initiating operation of the native application, wherein the native application communicates with the first computer system over a public network to access information enabling use of the one or more non-native applications by the user;
   displaying one or more user-selectable interface elements each representing a corresponding one of the one or more non-native applications;
   upon user selection of one of the one or more user interface elements, establishing a dedicated portion of the display for use by functionality, of the corresponding non-native application, that is performed at a corresponding one of at least one second computer system, and activating the functionality; and
   relinquishing control over the dedicated portion of the display to the activated functionality of the non-native application corresponding to the selected one of the one or more user interface elements.

2. The method according to claim 1, wherein the native application comprises code directly executable by at least one processor of the user communication device.

3. The method according to claim 1, wherein the one or more non-native applications do not comprise code directly executable by the at least one processor of the user communication device.

4. The method according to claim 1, wherein the information enabling operation of the one or more non-native applications identifies the one or more non-native applications and the corresponding one of the at least one second computer system that performs the functionality of each of the one or more non-native applications.

5. The method according to claim 1, wherein the at least a second computer system communicates with the first computer system to access information about the user.

6. The method according to claim 1, wherein the first computer system directs the native application to establish communication with the at least one second computer system in response to a request to add the one or more non-native applications within the native application.

7. The method according to claim 1, wherein the request to the first computer system to enable operation of the one or more non-native applications within the native application is conveyed through a web page served by the first computer system.

8. The method according to claim 1, wherein the non-native application is enabled to one or both of access functionality of the native application and direct the native application to display a designated page or screen of the native application.

9. A system for a user communication device supporting installation of non-native applications within a native application in memory of the user communication device, the system comprising:
   at least one processor for communicatively coupling to a display, the at least one processor operable to, at least:

communicate a user request to a first computer system to enable operation of one or more non-native applications within the native application within memory of the user communication device;

initiate operation of the native application, wherein the native application communicates with the first computer system over a public network to access information enabling use of the one or more non-native applications by the user;

display one or more user-selectable interface elements each representing a corresponding one of the one or more non-native applications;

upon user selection of one of the one or more user interface elements, establish a dedicated portion of the display for use by functionality, of the corresponding non-native application, that is performed at a corresponding one of at least one second computer system, and activating the functionality; and relinquish control over the dedicated portion of the display to the activated functionality of the non-native application corresponding to the selected one of the one or more user interface elements.

10. The system according to claim 9, wherein the native application comprises code directly executable by at least one processor of the user communication device.

11. The system according to claim 9, wherein the one or more non-native applications do not comprise code directly executable by the at least one processor of the user communication device.

12. The system according to claim 9, wherein the information enabling operation of the one or more non-native applications identifies the one or more non-native applications and the corresponding one of the at least one second computer system that performs the functionality of each of the one or more non-native applications.

13. The system according to claim 9, wherein the at least a second computer system communicates with the first computer system to access information about the user.

14. The system according to claim 9, wherein the first computer system directs the native application to establish communication with the at least one second computer system in response to the request to add the one or more non-native applications within the native application.

15. The system according to claim 9, wherein the request to the first computer system to enable operation of the one or more non-native applications within the native application is conveyed through a web page served by the first computer system.

16. The system according to claim 9, wherein the non-native application is enabled to one or both of access functionality of the native application and direct the native application to display a designated page or screen of the native application.

17. A non-transitory computer-readable medium having stored thereon a plurality of code sections, each code section comprising a plurality of instructions executable by a processor to cause the processor to perform actions comprising:

communicating a user request to a first computer system to enable operation of one or more non-native applications within a native application in memory of the user device;

initiating operation of the native application, wherein the native application communicates with the first computer system over a public network to access information enabling use of the one or more non-native applications by the user;

displaying one or more user-selectable interface elements each representing a corresponding one of the one or more non-native applications;

upon user selection of one of the one or more user interface elements, establishing a dedicated portion of the display for use by functionality, of the corresponding non-native application, that is performed at a corresponding one of at least one second computer system, and activating the functionality; and relinquishing control over the dedicated portion of the display to the activated functionality of the non-native application corresponding to the selected one of the one or more user interface elements.

18. The non-transitory computer-readable medium according to claim 17, wherein the native application comprises code directly executable by at least one processor of the user communication device.

19. The non-transitory computer-readable medium according to claim 17, wherein the one or more non-native applications do not comprise code directly executable by the at least one processor of the user communication device.

20. The non-transitory computer-readable medium according to claim 17, wherein the information enabling operation of the one or more non-native applications identifies the one or more non-native applications and the corresponding one of the at least one second computer system that performs the functionality of each of the one or more non-native applications.

21. The non-transitory computer-readable medium according to claim 17, wherein the at least a second computer system communicates with the first computer system to access information about the user.

22. The non-transitory computer-readable medium according to claim 17, wherein the first computer system directs the native application to establish user communication with the at least one second computer system in response to a request to add the one or more non-native applications within the native application.

23. The non-transitory computer-readable medium according to claim 17, wherein the user request to the first computer system to enable operation of the or more non-native applications within the native application is conveyed through a web page served by the first computer system.

24. The non-transitory computer-readable medium according to claim 17, wherein the non-native application is enabled to one or both of access functionality of the native application and direct the native application to display a designated page or screen of the native application.

* * * * *